United States Patent
Choi

(10) Patent No.: US 12,406,406 B2
(45) Date of Patent: Sep. 2, 2025

(54) ELECTRONIC DEVICE FOR PROVIDING AUGMENTED REALITY MODE, AND OPERATING METHOD THEREFOR

(71) Applicant: SAMSUNG ELECTRONICS CO., LTD., Suwon-si (KR)

(72) Inventor: Seunghwan Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 274 days.

(21) Appl. No.: 17/940,833

(22) Filed: Sep. 8, 2022

(65) Prior Publication Data

US 2023/0005193 A1 Jan. 5, 2023

Related U.S. Application Data

(63) Continuation of application No. PCT/KR2021/002979, filed on Mar. 10, 2021.

(30) Foreign Application Priority Data

Mar. 10, 2020 (KR) .................. 10-2020-0029812

(51) Int. Cl.
*G06T 11/00* (2006.01)
*G06F 3/01* (2006.01)
(Continued)

(52) U.S. Cl.
CPC ............ *G06T 11/00* (2013.01); *G06F 3/01* (2013.01); *G06F 3/011* (2013.01); *G06F 3/0484* (2013.01);
(Continued)

(58) Field of Classification Search
None
See application file for complete search history.

(56) References Cited

U.S. PATENT DOCUMENTS 9,754,414 B2 9/2017 Kim et al.
10,681,287 B2 6/2020 Park et al.
(Continued)

FOREIGN PATENT DOCUMENTS

KR 10-2010-0032660 3/2010
KR 10-2012-0026702 3/2012
(Continued)

OTHER PUBLICATIONS

Jens Grubert, Matthias Heinisch, Aaron Quigley, Dieter Schmalstieg, "MultiFi: Multi-Fidelity Interaction with Displays on and Around the Body", Apr. 18, 2015, CHI '15: Proceedings of the 33rd Annual ACM Conference on Human Factors in Computing Systems pp. 3933-3942.*
(Continued)

*Primary Examiner* — Robert Bader
(74) *Attorney, Agent, or Firm* — NIXON & VANDERHYE P.C.

(57) ABSTRACT

An electronic device may include a camera module, a processor operably connected to the camera module, and a memory operably connected to the processor, wherein the memory may store one or more instructions for allowing, during the execution thereof, the processor to identify a first interaction for a first application being executed, form a first application object for outputting an execution screen of the first application according to the identification of the first interaction, output an augmented reality space on the basis of an actual space recognized through the camera module, and output the first application object in the augmented reality space.

12 Claims, 14 Drawing Sheets

(51) Int. Cl.
*G06F 3/0484* (2022.01)
*G06F 9/451* (2018.01)
*G06T 19/20* (2011.01)
*G06V 20/20* (2022.01)
*G06V 40/20* (2022.01)

(52) U.S. Cl.
CPC .............. *G06F 9/451* (2018.02); *G06T 19/20* (2013.01); *G06V 20/20* (2022.01); *G06V 40/20* (2022.01); *G06T 2200/24* (2013.01); *G06T 2219/2016* (2013.01)

(56) References Cited

U.S. PATENT DOCUMENTS

| | | | |
|---|---|---|---|
| 11,308,653 B2 | 4/2022 | Yoon et al. | |
| 2009/0027334 A1* | 1/2009 | Foulk | G06F 3/04886 345/157 |
| 2010/0066698 A1 | 3/2010 | Seo | |
| 2012/0194541 A1 | 8/2012 | Kim et al. | |
| 2014/0152698 A1 | 6/2014 | Kim et al. | |
| 2014/0304612 A1* | 10/2014 | Collin | G06F 9/451 715/748 |
| 2017/0150139 A1* | 5/2017 | Lee | H04N 13/344 |
| 2017/0154188 A1* | 6/2017 | Meier | G06F 21/552 |
| 2019/0098227 A1 | 3/2019 | Park et al. | |
| 2019/0384460 A1* | 12/2019 | Harnisch | G06F 9/453 |
| 2020/0226835 A1* | 7/2020 | Farchy | G06F 3/0346 |
| 2020/0265613 A1 | 8/2020 | Yoon et al. | |
| 2020/0286449 A1* | 9/2020 | Yang | G02B 27/01 |

FOREIGN PATENT DOCUMENTS

| | | |
|---|---|---|
| KR | 10-2012-0087024 | 8/2012 |
| KR | 10-2014-0071086 | 6/2014 |
| KR | 10-2017-0090392 A | 8/2017 |
| KR | 10-2017-0125618 | 11/2017 |
| KR | 10-1894573 | 9/2018 |
| KR | 10-2019-0035116 | 4/2019 |
| KR | 10-2019-0059629 | 5/2019 |
| KR | 10-2019-0106404 | 9/2019 |
| KR | 10-2085136 B1 | 2/2020 |

OTHER PUBLICATIONS

Erwan Normand, Michael J. McGuffin, "Enlarging a Smartphone with AR to Create a Handheld VESAD (Virtually Extended Screen-Aligned Display)", Jan. 17, 2019, IEEE, 2018 IEEE International Symposium on Mixed and Augmented Reality (ISMAR), pp. 123-133.*

Marcos Serrano, Barrett Ens, Xing-Dong Yang, Pourang Irani, "Gluey: Developing a Head-Worn Display Interface to Unify the Interaction Experience in Distributed Display Environments", Aug. 24, 2015, ACM, Proceedings of the 17th International Conference on Human-Computer Interaction with Mobile Devices and Services.*

Xiang 'Anthony' Chen, Julia Schwarz, Chris Harrison, et al., "Around-Body Interaction: Sensing & Interaction Techniques for Proprioception-Enhanced Input with Mobile Devices", Sep. 23, 2014, ACM, Proceedings of the 16th International Conference on Human-Computer Interaction with Mobile Devices and Services.*

Korean Office Action dated Jan. 31, 2024 for JP Application No. 10-2020-0029812.

* cited by examiner ns by providing the multitasking screen using the augmented reality mode may be provided.

In addition, various effects directly or indirectly identified through the disclosure may be provided.

ELECTRONIC DEVICE FOR PROVIDING AUGMENTED REALITY MODE, AND OPERATING METHOD THEREFOR

CROSS REFERENCE TO RELATED APPLICATION

This application is a continuation of International Application No. PCT/KR2021/002979 designating the United States, filed on Mar. 10, 2021, in the Korean Intellectual Property Receiving Office and claiming priority to Korean Patent Application No. 10-2020-0029812 filed Mar. 10, 2020, the disclosures of which are hereby incorporated herein by reference for all purposes as if fully set forth herein.

FIELD

Various embodiments relate to an electronic device that provides an augmented reality mode and an operation method thereof.

BACKGROUND

Augmented reality (AR) as a field of virtual reality (VR) is a computer graphic technique that synthesizes a virtual object or information in an actual environment to make the virtual object or information look like an object existing in the original environment.

An electronic device may provide a multitasking screen that facilitates switching between tasks, such as switching an application in use to another application. The multitasking screen may receive a selection input of a user by displaying at least one application and/or task being executed.

SUMMARY

The disclosure is to provide an electronic device and/or an operation method thereof that enable intuitive application search and switching and/or simplify a content sharing process between applications by providing a multitasking screen using an augmented reality mode.

An electronic device according to an example embodiment may include a camera module including imaging circuitry and/or at least one lens, a processor operatively connected to the camera module, and a memory operatively coupled to the processor, and the memory stores instructions that, when executed, may cause the processor to identify a first interaction for a first application being executed, form a first app object of outputting an execution screen of the first application as the first interaction is identified, output an augmented reality space based on a real space recognized via the camera module, and output the first app object in the augmented reality space.

An operation method of an electronic device for providing an augmented reality mode according to an example embodiment may include identifying a first interaction for a first application being executed, forming a first app object of outputting an execution screen of the first application as the first interaction is identified, outputting an augmented reality space based on a real space recognized via the camera module, and outputting the first app object in the augmented reality space.

According to various example embodiments, the electronic device and/or the operation method thereof may enable the intuitive application search and switching and simplify the content sharing process between the applica-

BRIEF DESCRIPTION OF THE DRAWINGS

The above and other aspects, features, and advantages of certain example embodiments of the present disclosure will be more apparent from the following detailed description, taken in conjunction with the accompanying drawings, in which.

In connection with the description of the drawings, the same or similar reference numerals may be used for the same or similar components.

DETAILED DESCRIPTION

Hereinafter, various embodiments of the disclosure will be described with reference to the accompanying drawings. However, this is not intended to limit the disclosure to specific embodiments, and it should be understood to include various modifications, equivalents, and/or alternatives of embodiments of the disclosure.

Hereinafter, with reference to FIG. 1, a configuration of an electronic device according to an embodiment will be described.

Figure 1:
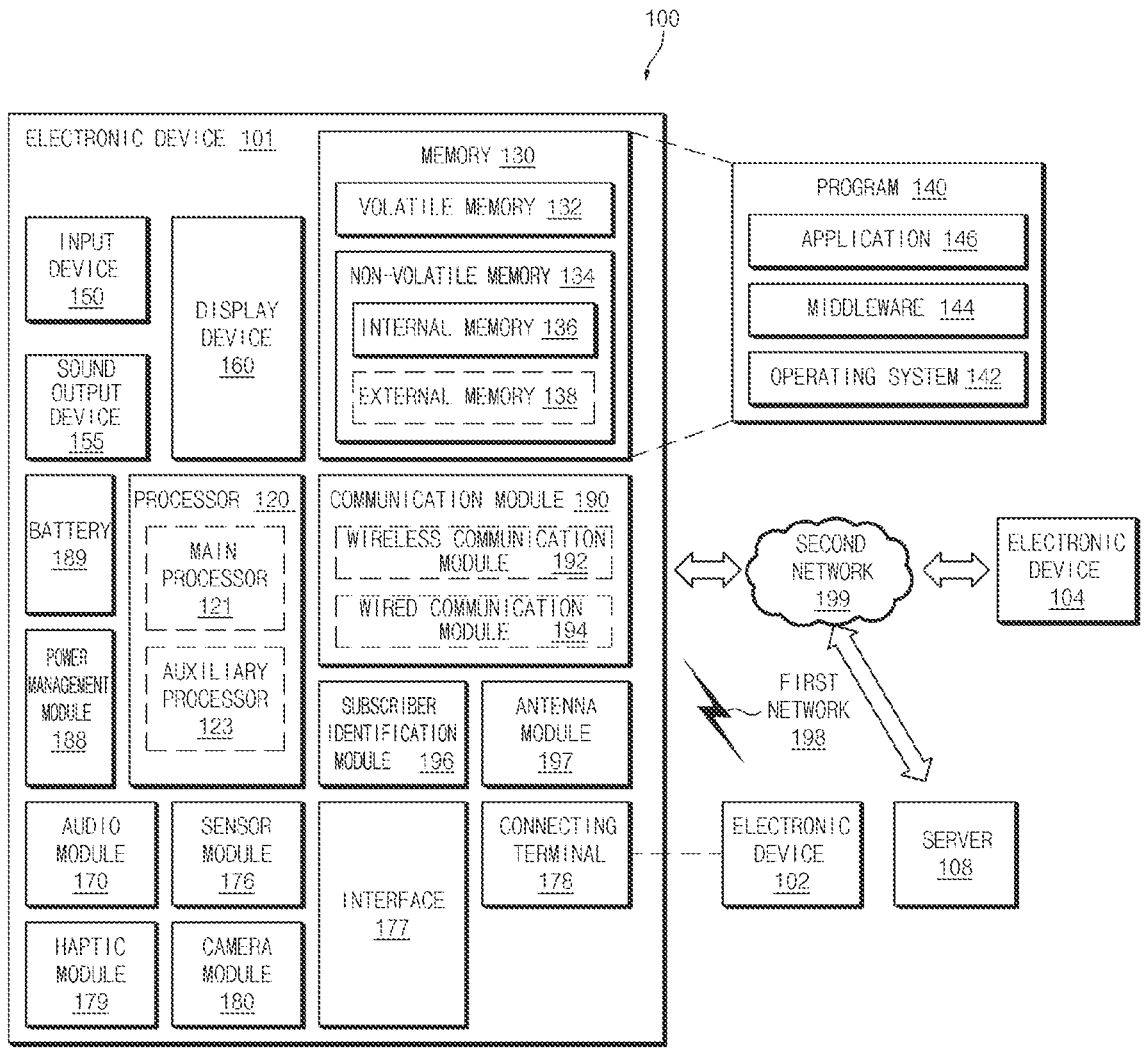
FIG. 1 is a block diagram of an electronic device in a network environment according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108.

According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Hereinafter, with reference to FIG. 2, an operation of an electronic device according to an embodiment will be described.

Figure 2:
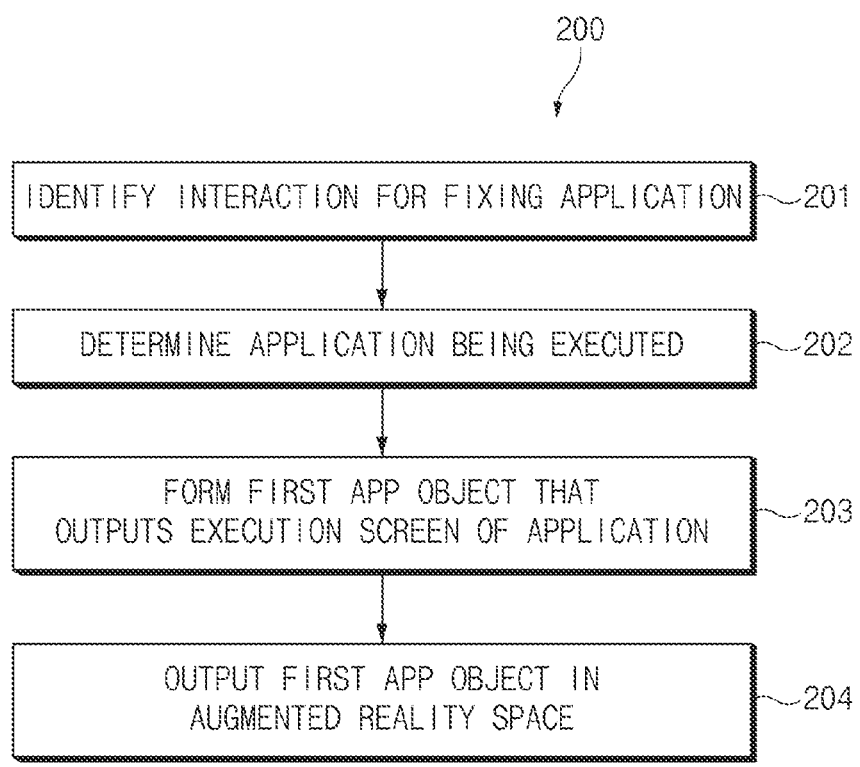
FIG. 2 is a flowchart showing operations of an electronic device according to an example embodiment.

FIG. 2 is a flowchart 200 showing operations of an electronic device according to an embodiment. The operations of the electronic device to be described below may be performed by a processor (e.g., the processor 120 in FIG. 1) of the electronic device (e.g., the electronic device 101 in FIG. 1).

Referring to FIG. 2, in operation 201, the electronic device (e.g., the electronic device 101 or the processor 120 in FIG. 1) may identify an interaction for fixing an application while the application (e.g., the application 146 in FIG. 1) stored in a memory (e.g., the memory 130 in FIG. 1) of the electronic device is being executed in an entire screen of the electronic device (e.g., while an execution screen of the application is being output with a first size).

According to one embodiment, the fixing of the application may mean or cover terminating the entire screen of the application being executed and placing a reduced screen of the application being executed in an augmented reality space (e.g., outputting the execution screen of the application in the augmented reality space with a second size smaller than the first size). According to one embodiment, the fixing of the application may mean or cover terminating the entire screen of the application being executed and outputting a multitasking screen or an application switching screen for multitasking or switching to another application.

According to one embodiment, the multitasking screen or the application switching screen may be implemented as an augmented reality space screen. According to one embodiment, the augmented reality space screen may include at least one icon for the multitasking and/or at least one reduced screen of the application, and the electronic device may execute a corresponding function when an input for selecting the icon or the reduced screen is received.

According to one embodiment, the interaction for fixing the application may include an operation in which a user moves the electronic device to a specific location in a real space. According to one embodiment, the specific location may be a location on the real space corresponding to a location where the user wants to fix the application in the augmented reality space. According to one embodiment, the interaction for fixing the application may include at least one of operations of touch, tap, double tap, triple tap, swipe, double swipe, pinch, spread, rotation, scroll, and drag of the entire screen of the application. According to one embodiment, the interaction for fixing the application may include at least one of operations of touch, tap, double tap, triple tap, swipe, double swipe, pinch, spread, rotation, scroll, long press, short press, and drag of the entire screen of the application after the user moves the electronic device to the specific location in the real space.

In operation 202, the electronic device (e.g., the electronic device 101 or the processor 120 in FIG. 1) may determine the application currently being executed in the entire screen of the electronic device as the interaction for fixing the application is identified. According to one embodiment, the electronic device may start outputting the application that is determined to currently being executed in the entire screen of the electronic device to a virtual memory for the multitasking or the switching of the application as the interaction for fixing the application is identified.

In operation 203, the electronic device (e.g., the electronic device 101 or the processor 120 in FIG. 1) may form a first app object that outputs the execution screen of the application currently being executed in the entire screen of the electronic device as the interaction for fixing the application is identified. According to one embodiment, the first app object may be an object that may be disposed in the augmented reality space. According to one embodiment, the first app object may be an object of augmented reality that may output the reduced screen that is obtained by reducing the execution screen of the application. According to one embodiment, the electronic device may map the reduced screen obtained by reducing the execution screen of the application currently being executed to the first app object. According to one embodiment, as the execution screen of the application currently being executed in the entire screen of the electronic device is mapped to the first app object, the execution screen of the application may be output as it is.

In operation 204, the electronic device (e.g., the electronic device 101 or the processor 120 in FIG. 1) may output the first app object that outputs the execution screen of the application in the augmented reality space. According to one embodiment, the electronic device may form the augmented reality space based on an external video recognized via a camera module (e.g., the camera module 180 in FIG. 1), and may execute an augmented reality mode that reproduces the formed augmented reality space. According to one embodiment, the electronic device may execute the augmented reality mode while terminating the entire screen of the application, and may output the first app object in the augmented reality space.

According to one embodiment, the electronic device may identify a location of the electronic device with a GPS and/or a compass of the electronic device at a time point at which the interaction for fixing the application of the user occurs, and may output the first app object at a location in the augmented reality space corresponding to identified coordinates of the electronic device. Alternatively, according to one embodiment, the electronic device may record a relative location of the first app object based on the location of the electronic device in the augmented reality space, so that, even when the electronic device (the user holding the electronic device) moves from the real space to another region, the first app object may be output to correspond to the relative location in the augmented reality space reflecting the corresponding region.

Hereinafter, with reference to FIG. 3, operations of an electronic device according to an embodiment will be described. Each embodiment herein may be used in combination with any other embodiment herein.

Figure 3:
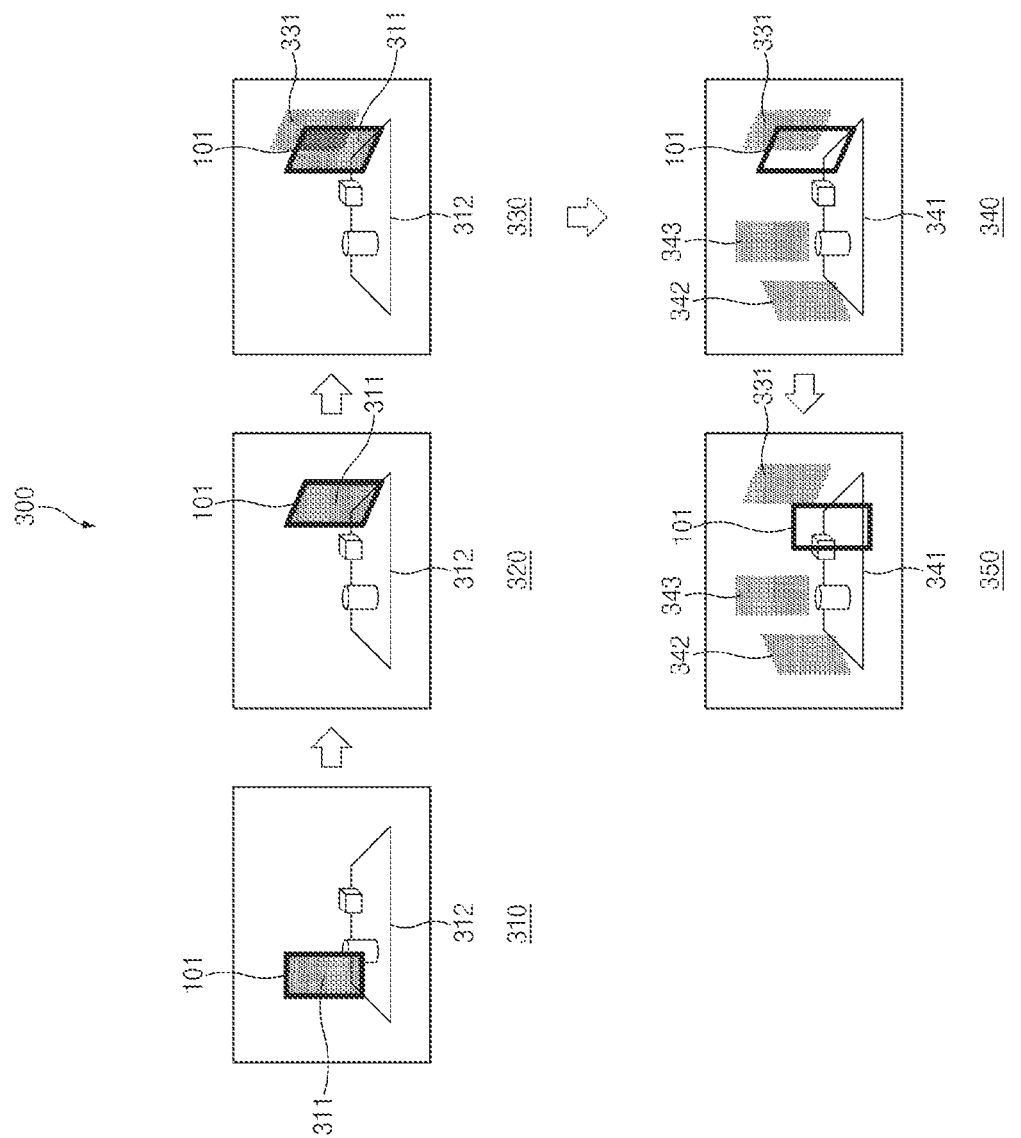
FIG. 3 is a diagram showing operations of an electronic device according to an example embodiment in order.

FIG. 3 is a diagram 300 showing operations of an electronic device according to an embodiment in order. Operations of the electronic device to be described below may be performed by the processor (e.g., the processor 120 in FIG. 1) of the electronic device (e.g., the electronic device 101 in FIG. 1). The same component as that in the above-described embodiment may be referred to by the same reference number, and the description of the same content may be omitted.

Referring to a first drawing 310 in FIG. 3, the electronic device 101 (or the processor 120) may output an execution screen of an application 311 in the entire screen of the electronic device 101. The electronic device 101 may be located at an arbitrary location in a real space 312.

Referring to a second drawing 320 in FIG. 3, the user possessing the electronic device 101 may move to a specific location in the real space 312 together with the electronic device 101.

Referring to a third drawing 330 in FIG. 3, as the electronic device 101 moves to the specific location in the real space 312, or as an input for fixing the application 311 is additionally received after the movement, the electronic device 101 may identify that an interaction for fixing the application 311 has occurred.

According to one embodiment, the electronic device 101 may determine the application 311 currently being executed in the entire screen of the electronic device 101 as the interaction for fixing the application 311 is identified. In addition, according to one embodiment, the electronic device 101 may start outputting the application 311 that is currently being executed in the entire screen of the electronic device 101 to the virtual memory for the multitasking or the switching of the application as the interaction for fixing application 311 is identified.

According to one embodiment, the electronic device 101 may form a first app object 331 as the interaction for fixing the application 311 is identified. According to one embodiment, the electronic device 101 may map the execution screen of the application 311 currently being executed in the entire screen of the electronic device 101 to the formed first app object 331.

Referring to a fourth drawing 340 in FIG. 3, the electronic device 101 may output the first app object 331 mapped with the execution screen of the application in an augmented reality space 341. The electronic device 101 may form the augmented reality space 341 based on the real space 312 recognized via the camera module (e.g., the camera module 180 in FIG. 1), and may output the first app object 331 at a location in the augmented reality space 341 corresponding to coordinates of the real space 312 of the electronic device 101. The electronic device 101 may terminate the entire screen of the application while executing the augmented reality mode that reproduces the formed augmented reality space 341 and output a content of the augmented reality space 341 on a display device.

According to one embodiment, the augmented reality space 341 may output not only the first app object 331, but also a second app object 342 to which an execution screen of a second application is mapped, and a third app object 343 to which an execution screen of a third application is mapped.

Referring to a fifth drawing 350 in FIG. 3, as the electronic device 101 moves in the real space, the content of the augmented reality space 341 corresponding to the location of the electronic device 101 is output on the display device (e.g., the display device 160 in FIG. 1), and the user may switch the applications by selecting one of the first app object 331, the second app object 342, and the third app object 343 on the content of the augmented reality space 341 output on the electronic device 101. For example, when an input of selecting the second app object 342 is received from the user, the electronic device 101 may terminate the augmented reality mode and may execute the second application in the entire screen.

Hereinafter, with reference to FIG. 4, operations of an electronic device according to an embodiment will be described.

Figure 4:
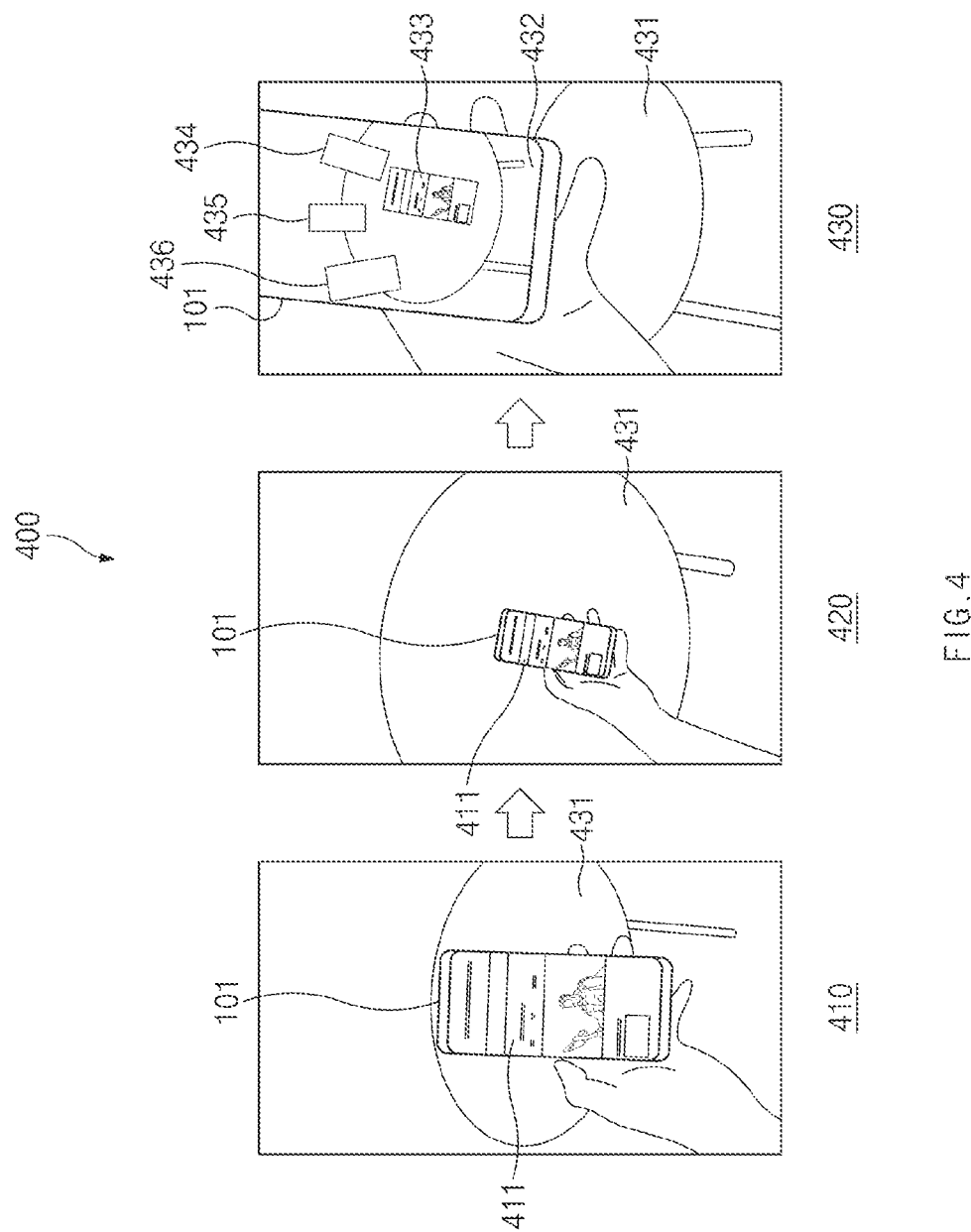
FIG. 4 is a diagram showing operations of an electronic device according to an example embodiment in order.

FIG. 4 is a diagram 400 showing operations of an electronic device according to an embodiment in order. Operations of the electronic device to be described below may be performed by the processor (e.g., the processor 120 in FIG. 1) of the electronic device (e.g., the electronic device 101 in FIG. 1). The same component as that in the above-described embodiment may be referred to by the same reference number, and the description of the same content may be omitted.

Referring to a first drawing 410 in FIG. 4, the electronic device 101 (or the processor 120) may output an application 411 being executed in the entire screen of the electronic device 101. The electronic device 101 may be located at an arbitrary location in a real space 431. According to one embodiment, the real space 431 in which a table is located is assumed.

Referring to a second drawing 420 in FIG. 4, the user possessing the electronic device 101 may move to a specific location in the real space 431 together with the electronic device 101. According to one embodiment, it is assumed that the electronic device 101 has moved to a location near the table so that a distance to the table 431 is reduced.

According to one embodiment, when the user moves to the specific location in the real space, the electronic device 101 may identify that an interaction for fixing the application 411 has occurred.

Alternatively, according to one embodiment, as the user moves to a location in the real space corresponding to a location at which the application 411 is to be fixed in the virtual real space and an input (e.g., touch, tap, swipe, and the like) for fixing the application 411 is additionally input, the electronic device 101 may identify that the interaction for fixing the application 411 has occurred.

Referring to a third drawing 430 in FIG. 4, as it is identified that the interaction for fixing the application 411 has occurred, the electronic device 101 may form a first app object 433, and map the execution screen of the application 411 being executed in the entire screen of the electronic device 101 to the formed first app object 433. In addition, the electronic device 101 may form an augmented reality space 432 and output the first app object 433 in the formed augmented reality space 432. According to one embodiment, the electronic device 101 may form the augmented reality space 432 based on the real space 431 recognized via the camera module (e.g., the camera module 180 in FIG. 1), and, for example, the formed augmented reality space 432 may contain a table object corresponding to the table in the real space 431. In addition, for example, when a location of the electronic device 101 was on the table in the real space 431 at a time point at which the interaction for fixing the application 411 has occurred, the electronic device 101 may output the first app object 433 on the table object in the augmented reality space 432. The electronic device 101 may terminate the entire screen of the application 411 and execute the augmented reality mode to output the augmented reality space 432 on the display device (e.g., the display device 160 in FIG. 1). The camera module 180 may include imaging circuitry and/or at least one lens.

According to one embodiment, the augmented reality space 432 may include a second app object 434 to which the execution screen of the second application is mapped, a third app object 435 to which the execution screen of the third application is mapped, and a fourth app object 436 to which an execution screen of a fourth application is mapped, which are formed via a process similar to the process for forming the first app object 433. According to one embodiment, the augmented reality mode may provide the application switching screen for switching the application being used to another application.

Hereinafter, with reference to FIG. 5, operations of an electronic device according to an embodiment will be described.

Figure 5:
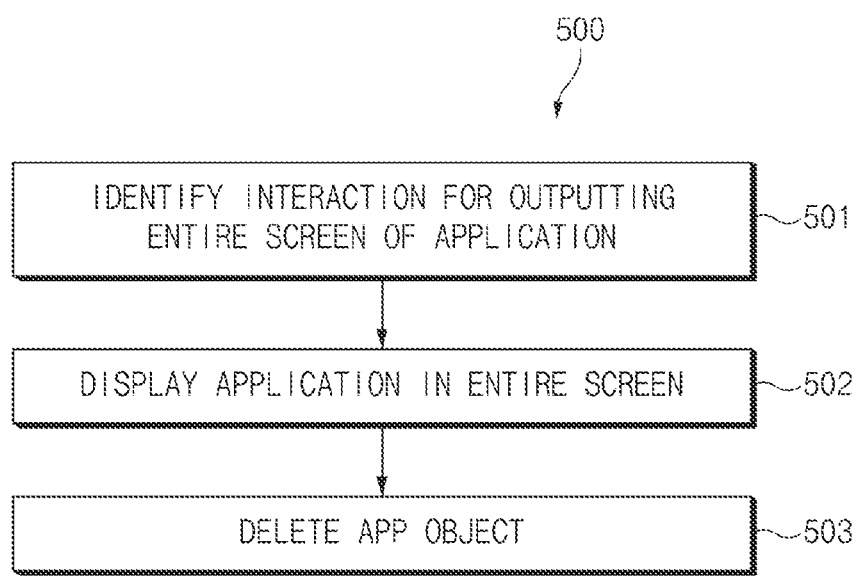
FIG. 5 is a flowchart showing operations of an electronic device according to an example embodiment.

FIG. 5 is a flowchart 500 showing operations of an electronic device according to an embodiment. Operations of the electronic device to be described below may be performed by the processor (e.g., the processor 120 in FIG. 1) of the electronic device (e.g., the electronic device 101 in FIG. 1). The same component as that in the above-described embodiment may be referred to by the same reference number, and the description of the same content may be omitted.

Referring to FIG. 5, in operation 501, the electronic device (e.g., the electronic device 101 or the processor 120 in FIG. 1) may identify the interaction for outputting the entire screen of the application (e.g., the application 146 in FIG. 1) while executing the augmented reality mode.

According to one embodiment, the interaction for outputting the entire screen of the application may be or include an input of selecting the app object in the augmented reality space. The input of selecting the app object according to an embodiment may be one of operations of touch, tap, double tap, triple tap, swipe, double swipe, pinch, spread, rotation, scroll, long press, short press, and drag for the app object.

According to one embodiment, the interaction for outputting the entire screen of the application may be moving the electronic device to the specific location in the real space. Alternatively, according to one embodiment, the interaction for outputting the entire screen of the application may be moving the electronic device to the location in the real space corresponding to the location of the app object in the augmented reality space. According to one embodiment, the interaction for outputting the entire screen of the application may include both the movement of the electronic device and the input of selecting the app object in the augmented reality space.

In operation 502, the electronic device (e.g., the electronic device 101 or the processor 120 in FIG. 1) may display the application corresponding to the selected app object in the entire screen of the display device (e.g., the display device 160 in FIG. 1) of the electronic device.

In operation 503, the electronic device (e.g., the electronic device 101 or the processor 120 in FIG. 1) may delete the selected app object and terminate the augmented reality mode.

According to one embodiment, operation 502 and operation 503 may be performed simultaneously.

Hereinafter, with reference to FIG. 6, operations of an electronic device according to an embodiment will be described.

Figure 6:
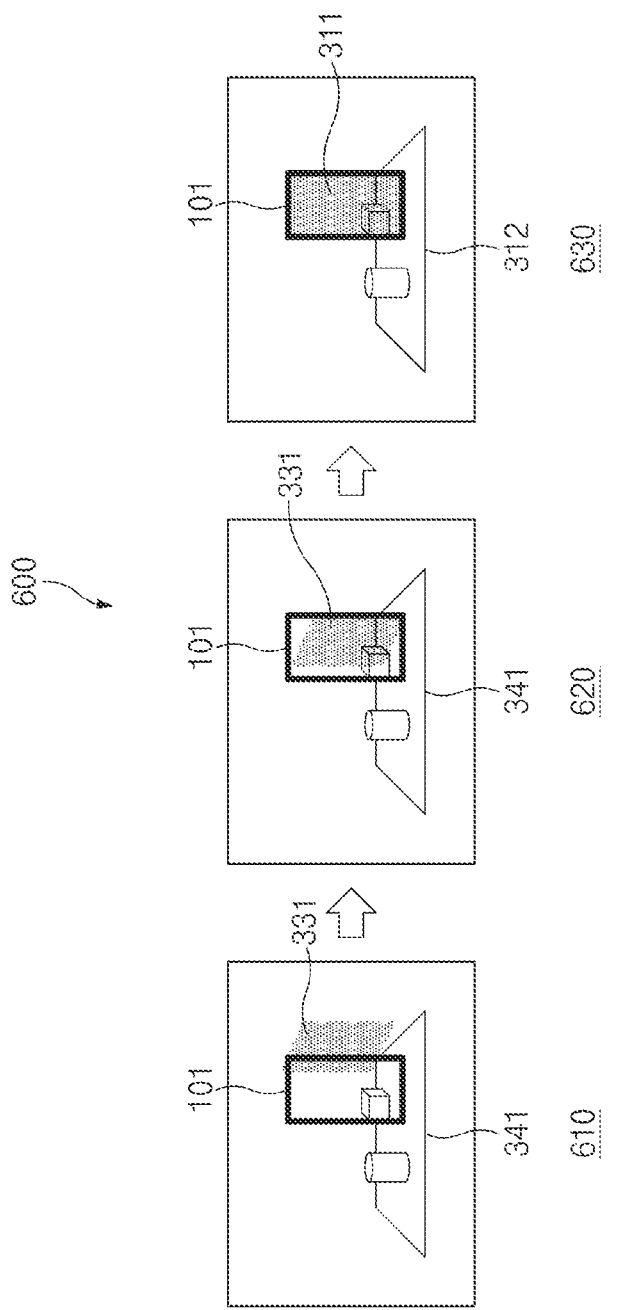
FIG. 6 is a diagram showing operations of an electronic device according to an example embodiment in order.

FIG. 6 is a diagram 600 showing operations of an electronic device according to an embodiment in order. Operations of the electronic device to be described below may be performed by the processor (e.g., the processor 120 in FIG. 1) of the electronic device (e.g., the electronic device 101 in FIG. 1). The same component as that in the above-described embodiment may be referred to by the same reference number, and the description of the same content may be omitted.

Referring to a first drawing 610 in FIG. 6, the electronic device 101 (or the processor 120) may receive an input of selecting the app object 331 in the augmented reality space 341 displayed on the display device (e.g., the display device 160 in FIG. 1) of the electronic device. The electronic device 101 may be executing the augmented reality mode.

According to one embodiment, the input of selecting the app object may be one of operations of touch, tap, double tap, triple tap, swipe, double swipe, pinch, spread, rotation, scroll, long press, short press, and drag for the app object.

Referring to a second drawing 620 in FIG. 6, the electronic device 101 may move the app object 331 in the augmented reality space 341 to the location of the electronic device 101 in the augmented reality space 341 as the input of selecting the app object 331 is received.

Referring to a third drawing 630 in FIG. 6, the electronic device 101 may output the application 311 corresponding to the selected app object 331 in the entire screen of the display device (e.g., the display device 160 in FIG. 1) of the electronic device. In addition, the electronic device 101 may delete the selected app object 331 and terminate the augmented reality mode. According to one embodiment, the electronic device 101 may not perform the operation of moving the app object 331 to the location of the electronic device 101 in the augmented reality space 341, which has been described via the second drawing 620 in FIG. 6, and perform the operation described via the third drawing 630 in FIG. 6.

Hereinafter, with reference to FIG. 7, operations of an electronic device according to an embodiment will be described.

Figure 7:
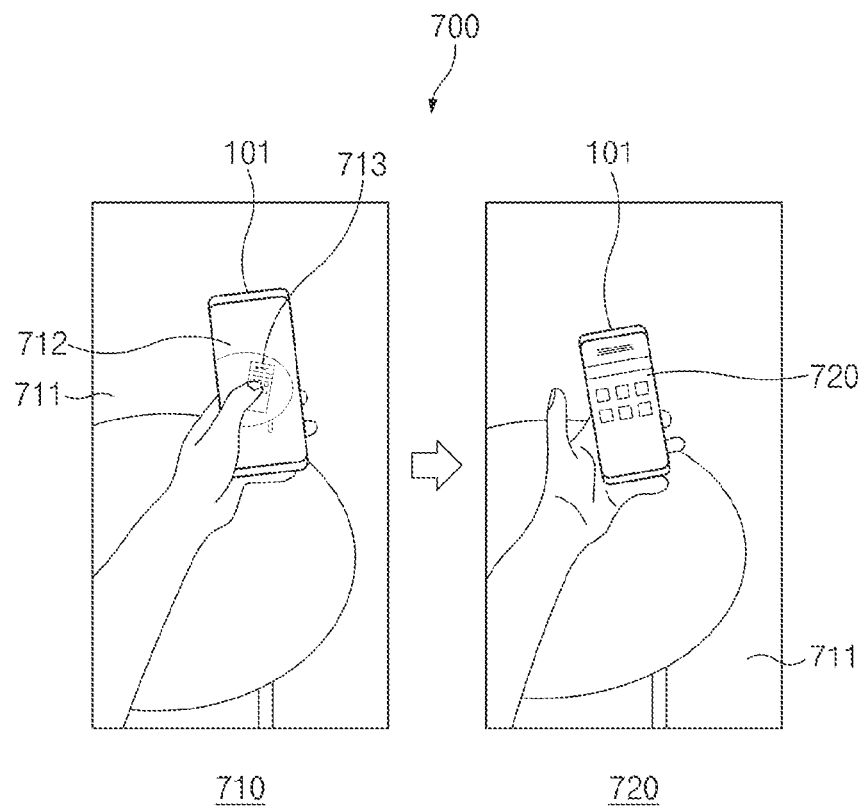
FIG. 7 is a diagram showing operations of an electronic device according to an example embodiment in order.

FIG. 7 is a diagram 700 showing operations of an electronic device according to an embodiment in order. Operations of the electronic device to be described below may be performed by the processor (e.g., the processor 120 in FIG. 1) of the electronic device (e.g., the electronic device 101 in FIG. 1). The same component as that in the above-described embodiment may be referred to by the same reference number, and the description of the same content may be omitted.

Referring to a first drawing 710 in FIG. 7, the electronic device 101 (or the processor 120) may be executing the augmented reality mode that displays an augmented reality space 712. The augmented reality space 712 may contain a table object corresponding to a table located in a real space 711.

According to one embodiment, the electronic device 101 may receive an input of selecting an app object 713 in the augmented reality space 712 that is output on the display device (e.g., the display device 160 in FIG. 1) of the electronic device. According to one embodiment, the input of selecting the app object 713 may be one of operations of touch, tap, double tap, triple tap, swipe, double swipe, pinch, spread, rotation, scroll, long press, short press, and drag for the app object 713.

Referring to a second drawing 720 in FIG. 7, as the input of selecting the app object 713 is received, the electronic device 101 may output an application 720 corresponding to the selected app object 713 in the entire screen of the display device of the electronic device. In addition, the electronic device 101 may delete the selected app object 713 and terminate the augmented reality mode.

Hereinafter, with reference to FIG. 8, operations of an electronic device according to an embodiment will be described.

Figure 8:
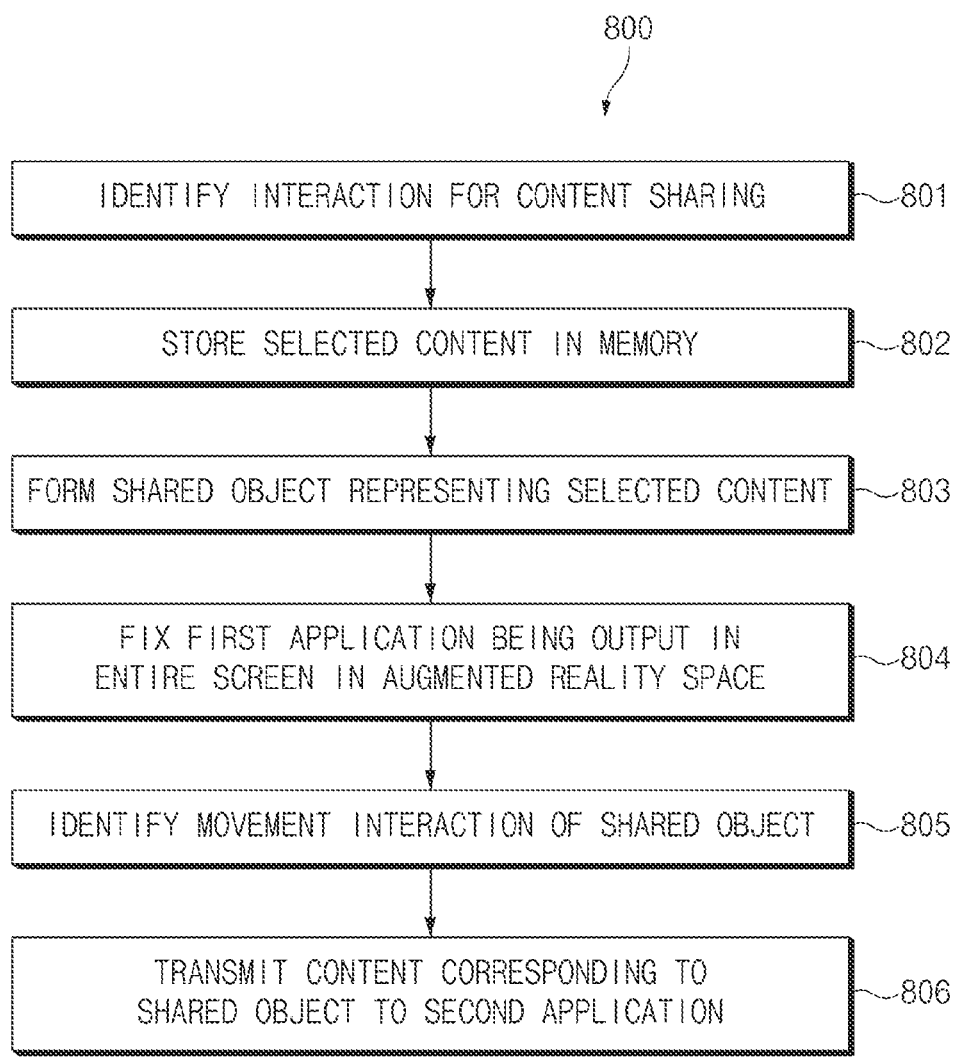
FIG. 8 is a flowchart showing operations of an electronic device according to an embodiment.

FIG. 8 is a flowchart 800 showing operations of an electronic device according to an embodiment. Operations of the electronic device to be described below may be performed by the processor (e.g., the processor 120 in FIG. 1) of the electronic device (e.g., the electronic device 101 in FIG. 1). The same component as that in the above-described embodiment may be referred to by the same reference number, and the description of the same content may be omitted.

Referring to FIG. 8, in operation 801, the electronic device (e.g., the electronic device 101 or the processor 120 in FIG. 1) may identify an interaction for content sharing. According to one embodiment, the interaction for the content sharing may be an input of selecting a content to be shared in the first application. According to one embodiment, the content may include at least one of a document, a text, an image, and a video. According to one embodiment, the input of selecting the content to be shared may be one of operations of touch, tap, double tap, triple tap, swipe, double swipe, pinch, spread, rotation, scroll, long press, short press, and drag for the corresponding content.

According to one embodiment, the interaction for the content sharing may be identified during the entire screen output of the first application, and may also be identified in the first app object for the first application output in the augmented reality space during the augmented reality mode execution. In FIG. 8, a description may be made assuming that the interaction for the content sharing is identified during the entire screen output of the application.

In operation 802, the electronic device (e.g., the electronic device 101 or the processor 120 in FIG. 1) may store the selected content in a memory.

In operation 803, the electronic device (e.g., the electronic device 101 or the processor 120 in FIG. 1) may form a shared object representing the selected content. According to one embodiment, the shared object may be or include an object that may be disposed in the augmented reality space. According to one embodiment, the shared object may be or include an object in the augmented reality that may output contents of the selected content.

In operation 804, the electronic device (e.g., the electronic device 101 or the processor 120 in FIG. 1) may fix the first application being output in the entire screen in the augmented reality space and execute the augmented reality mode. According to one embodiment, fixing the first application in the augmented reality space may include outputting the first app object corresponding to the first application at the specific location in the augmented reality space and terminating the entire screen output of the first application. According to one embodiment, the operation of fixing the first application in the augmented reality space may be performed by the process of the flowchart 200 in FIG. 2.

In operation 805, the electronic device (e.g., the electronic device 101 or the processor 120 in FIG. 1) may identify a movement interaction of the shared object during the execution of the augmented reality mode. According to one embodiment, the movement interaction of the shared object may mean an input of moving the shared object via operations such as touch, drag, swipe, press, and the like. According to one embodiment, the movement interaction of the shared object may be an operation of touching and dragging the shared object to drop the shared object on another app object.

In operation 806, the electronic device (e.g., the electronic device 101 or the processor 120 in FIG. 1) may transmit a content corresponding to the shared object to the second application when the interaction of moving the shared object onto the second app object corresponding to the second application is received.

Hereinafter, with reference to FIG. 9, operations of an electronic device according to an embodiment will be described.

Figure 9:
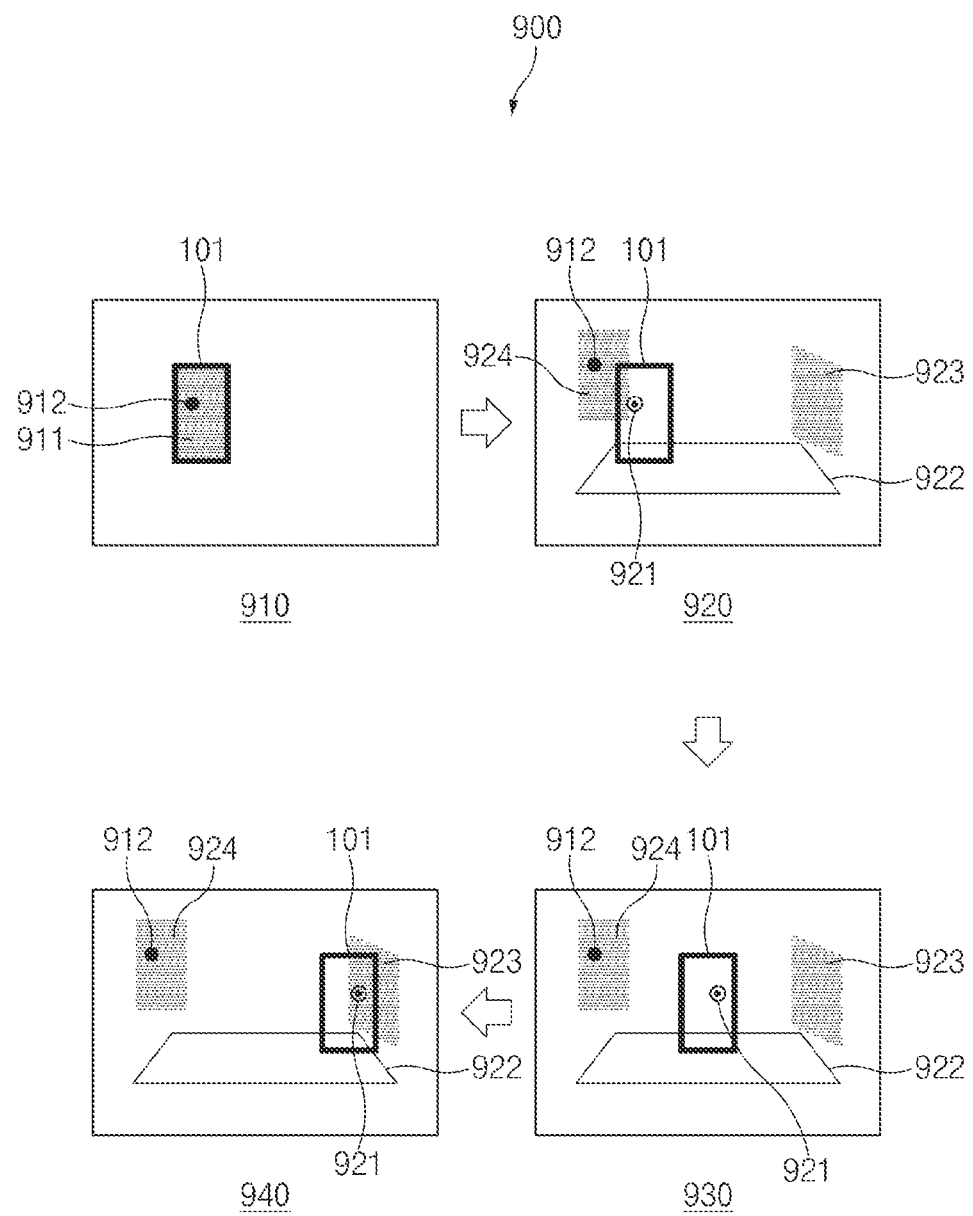
FIG. 9 is a diagram showing operations of an electronic device according to an example embodiment in order.

FIG. 9 is a diagram 900 showing operations of an electronic device according to an embodiment in order. Operations of the electronic device to be described below may be performed by the processor (e.g., the processor 120 in FIG. 1) of the electronic device (e.g., the electronic device 101 in FIG. 1). The same component as that in the above-described embodiment may be referred to by the same reference number, and the description of the same content may be omitted.

Referring to a first drawing 910 in FIG. 9, the electronic device 101 (or the processor 120) may output a first application 911 stored in the memory (e.g., the memory 130 in FIG. 1) of the electronic device 101 in the entire screen of the display device (e.g., the display device 160 in FIG. 1) of the electronic device 101. The electronic device 101 may identify an interaction of selecting a content 912 to be shared on an execution screen of the first application 911.

According to one embodiment, the content may contain at least one of a document, a text, an image, and a video displayed on the execution screen of the first application 911.

According to one embodiment, an input of selecting the content 912 to be shared may be one of operations of touch, tap, double tap, triple tap, swipe, double swipe, pinch, spread, rotation, scroll, long press, short press, and drag for the corresponding content.

According to one embodiment, the electronic device 101 may store the selected content 912 in the memory.

Referring to a second drawing 920 in FIG. 9, the electronic device 101 may form a shared object 921 representing the selected content 912. According to one embodiment, the shared object 921 may include an object that may be disposed in an augmented reality space 922. According to one embodiment, the shared object 921 may output a content of the selected content 912.

According to one embodiment, the electronic device 101 may fix the first application 911 being output in the entire screen according to the flowchart 200 in FIG. 2 in the augmented reality space 922 and execute the augmented reality mode. According to one embodiment, fixing the first application 911 in the augmented reality space 922 may include outputting a first app object 924 corresponding to the first application 911 at a specific location in the augmented reality space 922 and terminating the entire screen output of the first application 911. According to one embodiment, the augmented reality space 922 may contain a second app object 923 for the second application stored in the memory of the electronic device 101.

Referring to a third drawing 930 in FIG. 9, the electronic device 101 may identify a movement interaction of the shared object 921 while executing the augmented reality mode. According to one embodiment, the movement interaction of the shared object 921 may include an input of moving the shared object 921 via operations such as touch, drag, swipe, press, and the like. According to one embodiment, the movement interaction of the shared object 921 may be an operation of touching and dragging the shared object 921 to drop the shared object 921 on another app object. According to one embodiment, the movement interaction of the shared object 921 may include the movement of the electronic device 101 itself.

Referring to a fourth drawing 940 in FIG. 9, as an interaction of moving the shared object 921 onto the second app object 923 corresponding to the second application and dropping the shared object 921 is received, the electronic device 101 may transmit information (e.g., copy of the content, reference information of the content (an URL of the content, an ID of the content, and the like)) corresponding to the content 912 corresponding to the shared object 921 to the second application.

Hereinafter, with reference to FIG. 10, operations of an electronic device according to an embodiment will be described.

Figure 10:
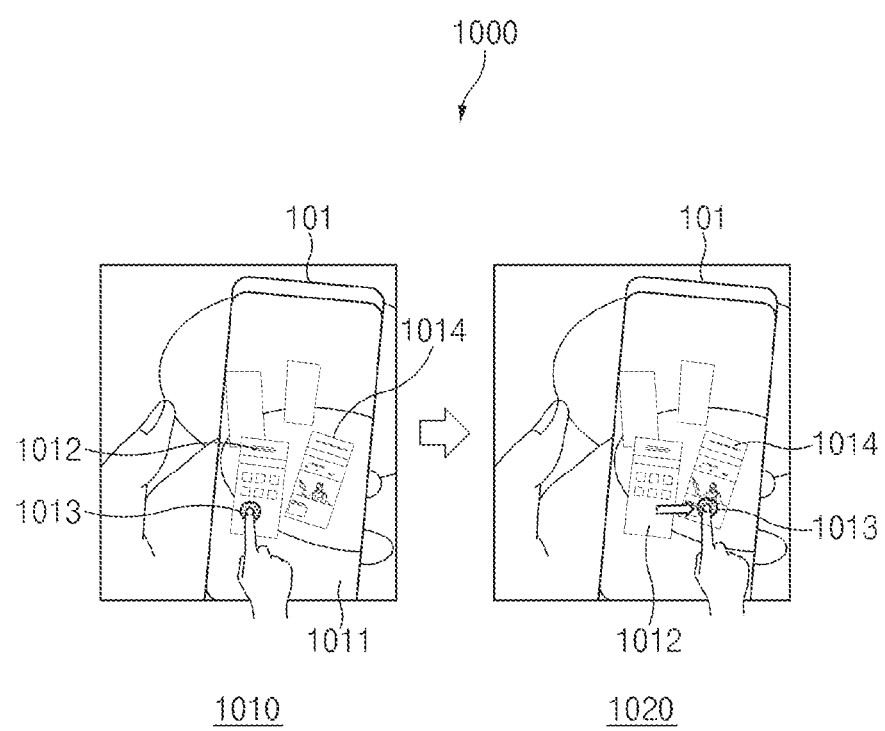
FIG. 10 is a diagram showing operations of an electronic device according to an example embodiment in order.

FIG. 10 is a diagram 1000 showing operations of an electronic device according to an embodiment in order. Operations of the electronic device to be described below may be performed by the processor (e.g., the processor 120 in FIG. 1) of the electronic device (e.g., the electronic device 101 in FIG. 1). The same component as that in the above-described embodiment may be referred to by the same reference number, and the description of the same content may be omitted.

Referring to a first drawing 1010 in FIG. 10, the electronic device 101 (or the processor 120) may output an augmented reality space 1011 by executing the augmented reality mode. According to one embodiment, the augmented reality space 1011 may contain a first app object 1012 and a second app object 1014.

According to one embodiment, the electronic device 101 may identify an interaction of selecting a content to be shared on the first app object 1012. According to one embodiment, the content may include at least one of a document, a text, an image, and a video displayed on an execution screen of the first app object 1012. According to one embodiment, the electronic device 101 may form a shared object 1013 that outputs a content of the selected content.

Referring to a second drawing 1020 in FIG. 10, the electronic device 101 may identify a movement interaction of the shared object 1013 while executing the augmented reality mode. According to one embodiment, the movement interaction of the shared object 1013 may be an operation of touching and dragging the shared object 1013 to drop the shared object 1013 on the second app object 1014. According to one embodiment, as the interaction of moving the shared object 1013 onto the second app object 1014 corresponding to the second application and dropping the shared object 1013 is received, the electronic device 101 may transmit information (e.g., copy of the content, reference information of the content (an URL of the content, an ID of the content, and the like)) corresponding to a content corresponding to the shared object 1013 to the second application.

Hereinafter, with reference to FIG. 11, operations of an electronic device according to an embodiment will be described.

Figure 11:
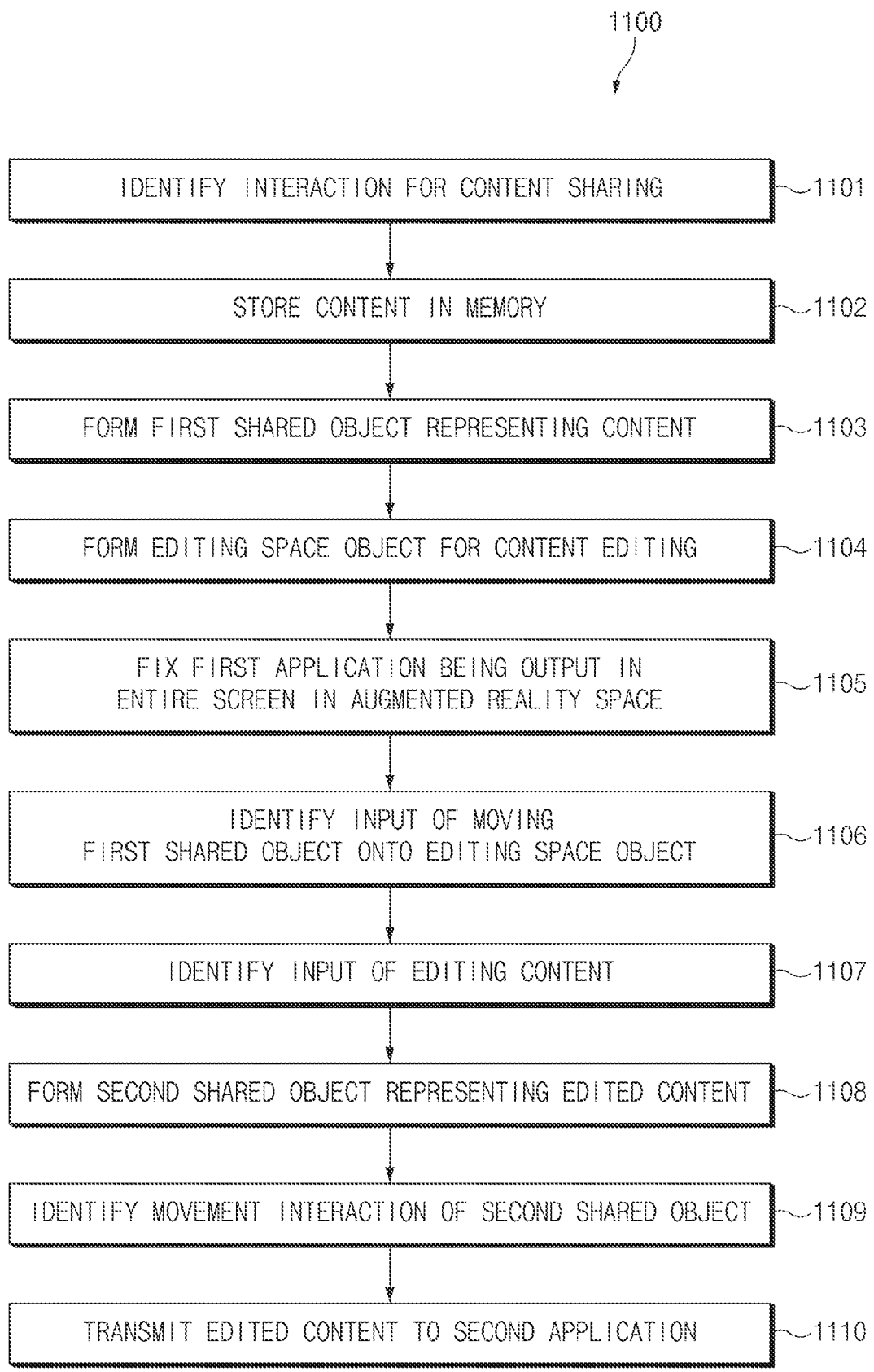
FIG. 11 is a flowchart showing operations of an electronic device according to an example embodiment.

FIG. 11 is a flowchart 1100 showing operations of an electronic device according to an embodiment. Operations of the electronic device to be described below may be performed by the processor (e.g., the processor 120 in FIG. 1) of the electronic device (e.g., the electronic device 101 in FIG. 1). The same component as that in the above-described embodiment may be referred to by the same reference number, and the description of the same content may be omitted. Each "processor" herein includes processing circuitry.

Referring to FIG. 11, in operation 1101, the electronic device (e.g., the electronic device 101 or the processor 120 in FIG. 1) may identify the interaction for the content sharing. According to one embodiment, the interaction for the content sharing may be the input of selecting the content to be shared in the first application. According to one embodiment, the content may include at least one of the document, the text, the image, and the video. According to one embodiment, the input of selecting the content to be shared may be one of operations of touch, tap, double tap, triple tap, swipe, double swipe, pinch, spread, rotation, scroll, long press, short press, and drag for the corresponding content.

According to one embodiment, the interaction for the content sharing may be identified during the entire screen output of the first application, and may be identified on the first app object for the first application output in the augmented reality space during the execution of the augmented reality mode. In FIG. 11, a description may be made assuming that the interaction for the content sharing is identified during the entire screen output of the application.

In operation 1102, the electronic device (e.g., the electronic device 101 or the processor 120 in FIG. 1) may store the selected content in the memory.

In operation 1103, the electronic device (e.g., the electronic device 101 or the processor 120 in FIG. 1) may form the first shared object representing the content of the selected content. According to one embodiment, the shared object may include the object that may be disposed in the augmented reality space.

In operation 1104, the electronic device (e.g., the electronic device 101 or the processor 120 in FIG. 1) may form an editing space object for providing a space for editing the content to be shared. According to one embodiment, the editing space object may include an object that may be disposed in the augmented reality space. According to one embodiment, the user may move the content onto the editing space object and edit the content on the editing space object.

In operation 1105, the electronic device (e.g., the electronic device 101 or the processor 120 in FIG. 1) may fix the first application being output in the entire screen in the augmented reality space and execute the augmented reality mode. According to one embodiment, fixing the first application in the augmented reality space may include outputting the first app object corresponding to the first application at the specific location in the augmented reality space and terminating the entire screen output of the first application. According to one embodiment, the operation of fixing the first application in the augmented reality space may be performed by the process of the flowchart 200 in FIG. 2.

In operation 1106, the electronic device (e.g., the electronic device 101 or the processor 120 in FIG. 1) may identify an input of moving the first shared object onto the editing space object while the augmented reality mode is being executed. According to one embodiment, the electronic device may identify an operation of touching and dragging the first shared object to drop the first shared object on the editing space object. According to one embodiment, as the input of moving the first shared object onto the editing space object is identified during the execution of the augmented reality mode, the electronic device may temporarily store a copy of the content corresponding to the first shared object in the editing space object. In addition, the electronic device may output the copy of the content stored in the editing space object on the editing space object so as to be edited by the user.

In operation 1107, the electronic device (e.g., the electronic device 101 or the processor 120 in FIG. 1) may identify an input of the user of editing the copy of the content displayed on the editing space object. According to one embodiment, the editing may include copying, cutting, pasting, and/or pasting with another content of the content.

In operation 1108, the electronic device (e.g., the electronic device 101 or the processor 120 in FIG. 1) may form a second shared object representing a content of the edited content. According to one embodiment, the electronic device may form the second shared object as an input, by the user, of selecting the edited content is received via touch, long press, tap, double tap, and the like.

In operation 1109, the electronic device (e.g., the electronic device 101 or the processor 120 in FIG. 1) may identify the movement interaction of the second shared object. According to one embodiment, the movement interaction of the shared object may include an input of moving the shared object via operations such as touch, drag, swipe, press, and the like. According to one embodiment, the movement interaction of the shared object may be the operation of touching and dragging the shared object to drop the shared object on another app object. According to one embodiment, the electronic device may identify an operation of touching and dragging the second shared object to drop the second shared object on the second app object corresponding to the second application.

In operation 1110, as the interaction of moving the second shared object onto the second app object corresponding to the second application is received, the electronic device (e.g., the electronic device 101 or the processor 120 in FIG. 1) may transmit the edited content corresponding to the second shared object to the second application.

Hereinafter, with reference to FIGS. 12 and 13, operations of an electronic device according to an embodiment will be described.

Figure 12:
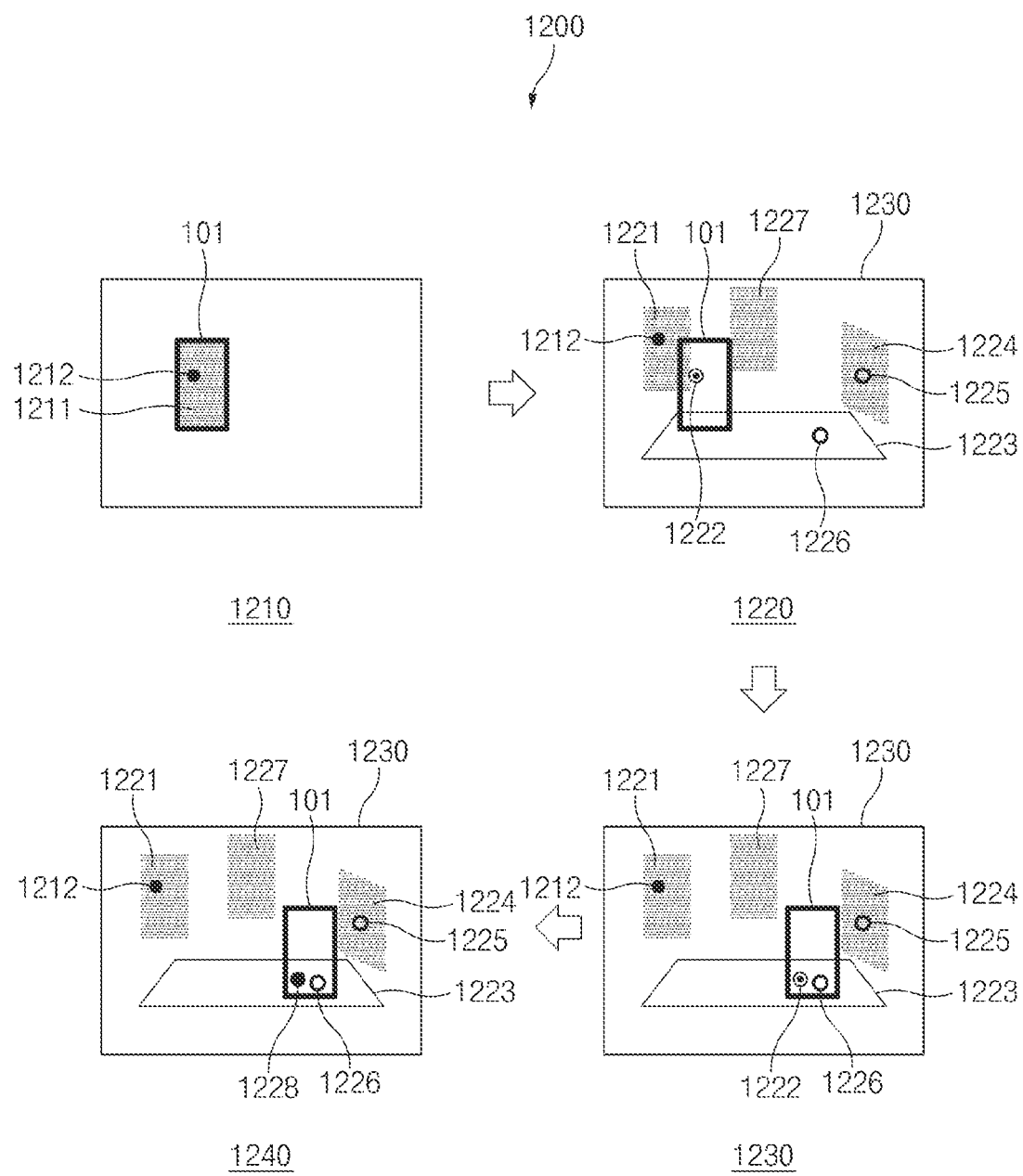
FIG. 12 is a diagram showing operations of an electronic device according to an example embodiment in order.

FIG. 12 is a diagram 1200 showing operations of an electronic device according to an embodiment in order. FIG. 13 is a diagram 1300 showing operations of an electronic device subsequent to operations in FIG. 12 of the electronic device according to an embodiment in order. Operations of the electronic device to be described below may be performed by the processor (e.g., the processor 120 in FIG. 1) of the electronic device (e.g., the electronic device 101 in FIG. 1). The same component as that in the above-described embodiment may be referred to by the same reference number, and the description of the same content may be omitted.

Referring to a first drawing 1210 in FIG. 12, the electronic device 101 (or the processor 120) may output a first application 1211 stored in the memory (e.g., the memory 130 in FIG. 1) of the electronic device 101 in the entire screen of the display device (e.g., the display device 160 in FIG. 1) of the electronic device 101.

According to one embodiment, the electronic device 101 may identify an interaction of selecting a first content 1212 to be shared on the execution screen of the first application 1211. According to one embodiment, the first content 1212 may contain at least one of a document, a text, an image, and a video displayed on the execution screen of the first application 1211. According to one embodiment, the input of selecting the first content 1212 to be shared may be one of operations of touch, tap, double tap, triple tap, swipe, double swipe, pinch, spread, rotation, scroll, long press, short press, and drag for the corresponding content. According to one embodiment, the electronic device 101 may store the selected content in the memory.

Referring to a second drawing 220 in FIG. 12, the electronic device 101 may form a first shared object 1222 representing the selected first content 1212. According to one embodiment, the first shared object 1222 may include an object that may be disposed in an augmented reality space 1230. According to one embodiment, the first shared object 1222 may output a content of the selected first content 1212.

According to one embodiment, the electronic device 101 may fix the first application 1211 being output in the entire screen according to the flowchart 200 in FIG. 2 in the augmented reality space 1230 and execute the augmented reality mode. According to one embodiment, fixing the first application 1211 in the augmented reality space 1230 may include outputting a first app object 1221 corresponding to the first application 1211 at a specific location in the augmented reality space 1230 and terminating the entire screen output of the first application 1211. According to one embodiment, the augmented reality space 1230 may contain a second app object 1224 for the second application and a third app object 1227 for the third application stored in the memory of the electronic device 101.

According to one embodiment, the electronic device 101 may form an editing space object 1223 for providing a space for editing the content to be shared. According to one embodiment, the editing space object 1223 may include an object that may be disposed in the augmented reality space 1230.

According to one embodiment, the user may move the content on the editing space object 1223 and edit the content on the editing space object. According to one embodiment, as the input of moving the shared object onto the editing space object is identified during the execution of the augmented reality mode, the electronic device may temporarily store the copy of the content corresponding to the shared object in the editing space object. In addition, the electronic device may output the copy of the content stored in the editing space object on the editing space object so as to be edited by the user. According to one embodiment, the electronic device 101 may output a second copy 1226 of a second content 1225 of the second app object 1224 stored in the editing space object 1223 on the editing space object 1223.

Referring to a third drawing 1230 in FIG. 12, the electronic device 101 may identify a movement interaction of the first shared object 1222 while the augmented reality mode is being executed. According to one embodiment, the movement interaction of the first shared object 1222 may include an input of moving the first shared object 1222 via operations such as touch, drag, swipe, press, and the like. According to one embodiment, the movement interaction of the first shared object 1222 may be an operation of touching and dragging the first shared object 1222 to drop the first shared object 1222 on the object 1224. According to one embodiment, the movement interaction of the first shared object 1222 may include the movement of the electronic device 101 itself.

Referring to a fourth drawing 1240 in FIG. 12, as the interaction of moving and dropping the first shared object 1222 onto the editing space object 1223 is received, the electronic device 101 may transmit a first copy 1228 of the first content 1212 corresponding to the first shared object 1222 to the editing space object 1223. According to one embodiment, as the input of moving the first shared object 1222 onto the editing space object 1223 is identified during the execution of the augmented reality mode, the electronic device 101 may temporarily store the first copy 1228 of the first content 1212 corresponding to the first shared object 1222 in the editing space object 1223. In addition, the electronic device 101 may output the first copy 1228 of the first content 1212 stored in the editing space object 1223 on the editing space object 1223 so as to be edited by the user.

Figure 13:
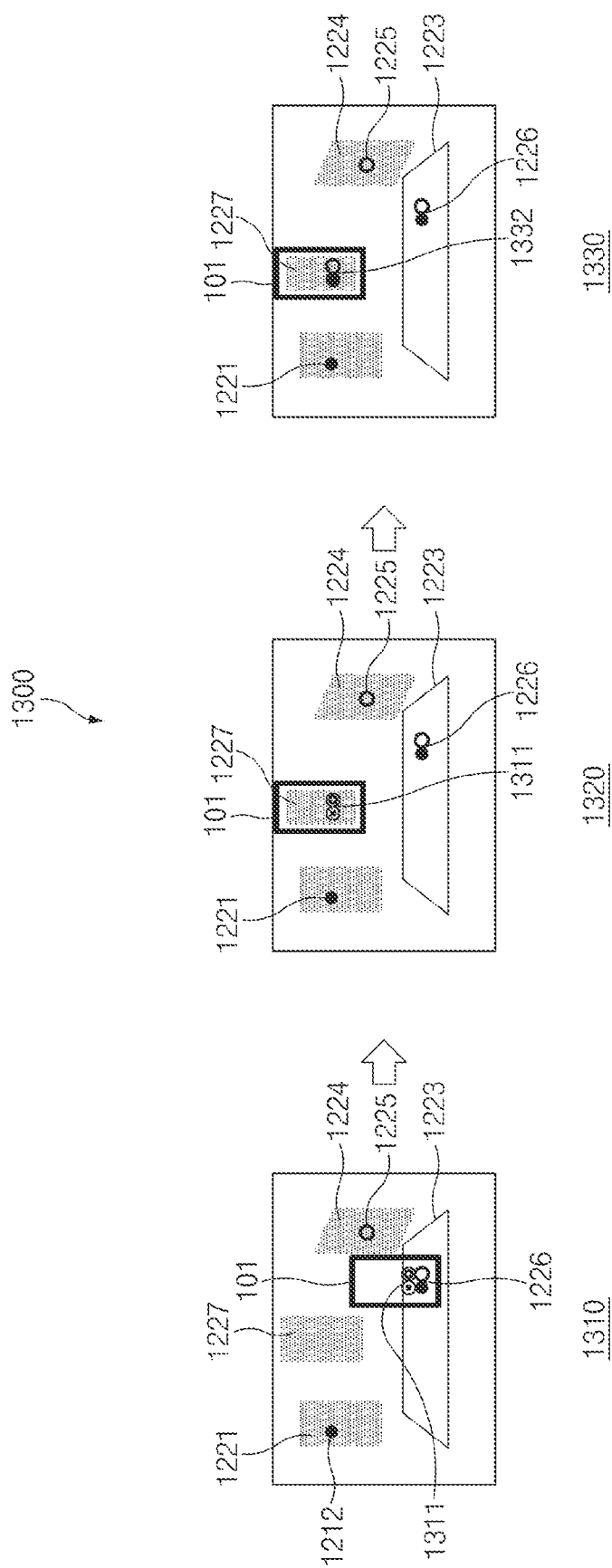
FIG. 13 is a diagram showing operations of an electronic device subsequent to operations in FIG. 12 of the electronic device according to an example embodiment in order.

Referring to a fifth drawing 1310 in FIG. 13, the electronic device 101 may form a second shared object 1311 representing a content of an edited content 1226.

According to one embodiment, the electronic device 101 may identify an input of the user of editing the first copy 1228 of the first content 1212 and the second copy 1226 of the second content 1225 displayed on the editing space object 1223. According to one embodiment, the editing may include the copying, the cutting, the pasting, or the pasting with another content of the content. According to one embodiment, the electronic device 101 may connect the first copy 1228 of the first content 1212 and the second copy 1226 of the second content 1225 displayed on the editing space object 1223 to each other to form the edited content 1311.

According to one embodiment, as an input, by the user, of selecting the edited content 1311 via touch, long press, tap, double tap, and the like is received, the electronic device 101 may form the second shared object 1311 representing a content of the edited content 1311.

Referring to a sixth drawing 1320 in FIG. 13, the electronic device 101 may identify a movement interaction of the second shared object 1311. According to one embodiment, the movement interaction of the second shared object 1311 may be an operation of touching and dragging the second shared object 1311 to drop the second shared object 1311 on the third app object 1227 corresponding to the third application. According to one embodiment, the movement interaction of the second shared object 1311 may include the movement of the electronic device 101 itself.

Referring to a seventh drawing 1330 in FIG. 13, as the interaction of moving the second shared object 1311 onto the third app object 1227 corresponding to the third application is received, the electronic device 101 may transmit a copy 1332 of the edited content 1226 corresponding to the second shared object 1311 to the second application.

Hereinafter, with reference to FIG. 14, operations of an electronic device according to an embodiment will be described.

Figure 14:
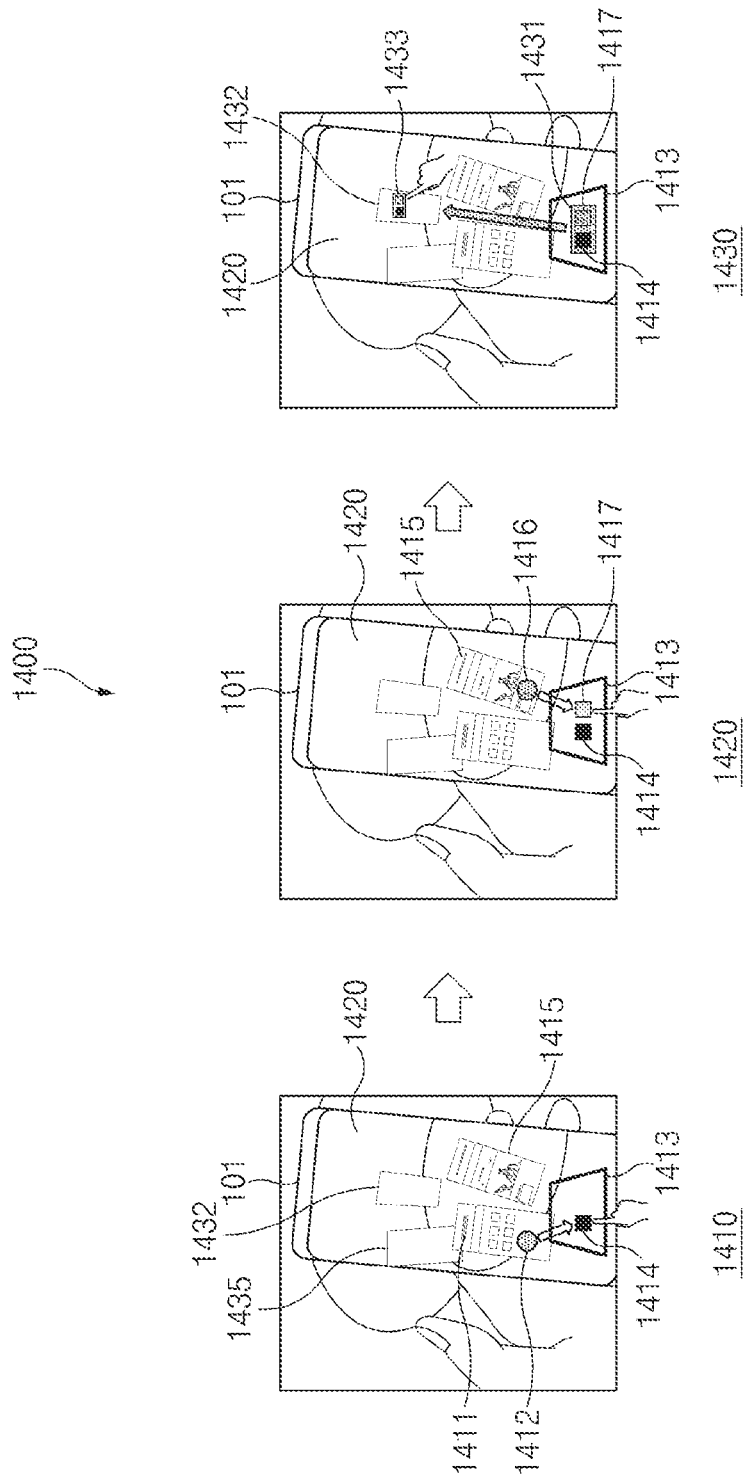
FIG. 14 is a diagram showing operations of an electronic device according to an example embodiment in order.

FIG. 14 is a diagram 1400 showing operations of an electronic device according to an embodiment in order. Operations of the electronic device to be described below may be performed by the processor (e.g., the processor 120 in FIG. 1) of the electronic device (e.g., the electronic device 101 in FIG. 1). The same component as that in the above-described embodiment may be referred to by the same reference number, and the description of the same content may be omitted.

Referring to a first drawing 1410 in FIG. 14, the electronic device 101 (or the processor 120) may execute the augmented reality mode to output an augmented reality space 1420 on the display device (e.g., the display device 160 in FIG. 1) of the electronic device 101. According to one embodiment, the augmented reality space 1420 may contain a first app object 1411 corresponding to the first application stored in the memory (e.g., the memory 130 in FIG. 1) of the electronic device 101, a second app object 1415 corresponding to the second application, a third app object 1432 corresponding to the third application, and a fourth app object 1435 corresponding to the fourth application. In addition, according to one embodiment, the augmented reality space 1420 may contain an editing space object 1413 for providing a space for editing the content.

According to one embodiment, the electronic device 101 may identify an interaction of selecting a first content 1412 to be shared on the first app object 1411. According to one embodiment, the content may include at least one of the document, the text, the image, and the video contained in the application. According to one embodiment, the input of selecting the content to be shared may be one of operations of touch, tap, double tap, triple tap, swipe, double swipe, pinch, spread, rotation, scroll, long press, short press, and drag for the corresponding content.

According to one embodiment, the electronic device 101 may form a first shared object representing the selected first content 1412, and may receive an input of moving the first shared object onto the editing space object 1413. According to one embodiment, as the input of moving the first shared object onto the editing space object 1413 is received, the electronic device 101 may store a first copy 1414 of the first content 1412 in the editing space object 1413, and output the first copy 1414 on the editing space object 1413.

Referring to a second drawing 1420 in FIG. 14, the electronic device 101 may identify an interaction of selecting a second content 1416 to be shared on the second app object 1415. According to one embodiment, the electronic device 101 may form a second shared object representing the selected second content 1416, and receive an input of moving the second shared object onto the editing space object 1413. According to one embodiment, as the input of moving the second shared object onto the editing space object 1413 is received, the electronic device 101 may store a second copy 1417 of the second content 1416 in the editing space object 1413, and output the second copy 1417 on the editing space object 1413.

Referring to a third drawing 1430 in FIG. 14, the electronic device 101 may identify an input of the user of editing the first copy 1414 and the second copy 1417 output on the editing space object 1413. According to one embodiment, the editing may include the copying, the cutting, the pasting, or the pasting with another content of the content. According to one embodiment, as the input, by the user, of selecting the edited content via touch, long press, tap, double tap, and the like is received, the electronic device 101 may form a third shared object 1433 representing a content of the edited content.

According to one embodiment, the electronic device 101 may identify an input of moving the third shared object 1433 onto the third app object 1432. According to one embodiment, as the input of moving the third shared object 1433 onto the third app object 1432 is identified, the electronic device 101 may transmit the edited content corresponding to the third shared object 1433 to the third application.

In FIG. 14, the editing space object 1413 is shown in an arbitrary shape, but, according to one embodiment, the editing space object may be in a shape that reproduces an object existing in the real space. In addition, according to one embodiment, when a user of an electronic device other than the electronic device 101 recognizes the object existing in the real space with the camera module while executing the augmented reality mode, the user may access and download the first copy 1414 and the second copy 1417 stored in the editing space object.

An electronic device according to an example embodiment includes a camera module, a processor operatively connected (directly or indirectly) to the camera module, and a memory operatively coupled to the processor, and the memory stores instructions that, when executed, cause the processor to identify a first interaction for a first application being executed, form a first app object of outputting an execution screen of the first application as the first interaction is identified, output an augmented reality space based on a real space recognized via the camera module, and output the first app object in the augmented reality space.

According to an example embodiment, the instructions may cause the processor to output the first app object at a location in the augmented reality space corresponding to a location of the electronic device in the real space at a time point when the first interaction has occurred.

According to an example embodiment, the first interaction may include an operation of moving the electronic device to a specific location in the real space.

According to an example embodiment, an entire screen of the first application may be terminated before or at the same time when the augmented reality space is output, and the entire screen of the first application may be output as a second interaction of moving the electronic device to the location of the first app object is identified.

According to an example embodiment, the instructions may cause the processor to form a first shared object representing a selected content as an input of selecting a content contained in the first application is received.

According to an example embodiment, the instructions may cause the processor to transmit information corresponding to the selected content to the second application when a third interaction of moving the first shared object to the second app object is received.

According to an example embodiment, the instructions may cause the processor to form an editing space object for content editing in the augmented reality space.

According to an example embodiment, the instructions may cause the processor to form a first shared object representing a selected content as an input of selecting a content contained in the first application is received, and store a copy of the selected content in the editing space object as a third interaction of moving the first shared object to the editing space object is received.

According to an example embodiment, the instructions may cause the processor to identify an input of forming an edited content by editing the copy in the editing space object.

According to an example embodiment, the instructions may cause the processor to form a second shared object representing the edited content as an input of selecting the edited content is received, and transmit the edited content to the second application as a fourth interaction of moving the second shared object to the second app object is received.

An operation method of an electronic device for providing an augmented reality mode according to an example embodiment may include identifying a first interaction for a first application being executed, forming a first app object of outputting an execution screen of the first application as the first interaction is identified, outputting an augmented reality space based on a real space recognized via a camera module, and outputting the first app object in the augmented reality space.

According to an example embodiment, the first app object may be output at a location in the augmented reality space corresponding to a location of the electronic device in the real space at a time point when the first interaction has occurred.

According to an example embodiment, the first interaction may include an operation of moving the electronic device to a specific location in the real space.

According to an example embodiment, an entire screen of the first application may be terminated before or at the same time when the augmented reality space is output, and the entire screen of the first application may be output as a second interaction of moving the electronic device to the location of the first app object in the augmented reality space is identified.

According to an example embodiment, a first shared object representing a selected content may be formed as an input of selecting a content contained in the first application is received.

According to an example embodiment, information corresponding to the selected content may be transmitted to the second application when a third interaction of moving the first shared object to the second app object is received.

According to an example embodiment, an editing space object for content editing may be formed in the augmented reality space.

According to an example embodiment, a first shared object representing a selected content may be formed as an input of selecting a content contained in the first application is received, and a copy of the selected content may be stored in the editing space object as a third interaction of moving the first shared object to the editing space object is received.

According to an example embodiment, an input of forming an edited content by editing the copy in the editing space object may be identified.

According to an example embodiment, a second shared object representing the edited content may be formed as an input of selecting the edited content is received, and the edited content may be transmitted to the second application as a fourth interaction of moving the second shared object to the second app object is received.

An electronic device according to an example embodiment includes a camera module comprising imaging circuitry, a processor operatively connected to the camera module and a memory operatively coupled to the processor, wherein the memory stores instructions that, when executed, are configured to cause the processor to: identify a first interaction in a state of outputting an execution screen of a first application with a first size, control to output an augmented reality space based on a real space recognized via the camera module as the first interaction is identified, control to output, in the augmented reality space, a first app object of outputting the execution screen of the first application with a second size smaller than the first size and a second app object of outputting an execution screen of a second application different from the first application with the second size and control to output the execution screen of the second application corresponding to the selected second app object as a screen with the first size in response to identification of a second interaction of selecting the second app object. According to an embodiment, the camera module comprises the imaging circuitry and/or a lens.

According to an example embodiment, wherein the instructions are configured to cause the processor to control to output the first app object and the second app object at a location in the augmented reality space corresponding to a location of the electronic device in the real space at a time point when the first interaction has occurred.

According to an example embodiment, wherein the first interaction includes an operation of moving the electronic device to a specific location in the real space.

According to an example embodiment, wherein the instructions and/or processor are configured so that the first app object and the second app object are to be output after terminating the output of the execution screen of the first application with the first size before or at the same time the augmented reality space is output, wherein the instructions and/or processor are configured so that the execution screen of the second application is to be output with the first size as the second interaction of moving the electronic device to a location of the second app object in the augmented reality space is received.

According to an example embodiment, wherein the instructions are configured to cause the processor to control to output the execution screen of the second application as the screen with the first size after terminating the output of the first app object and the second app object in response to the identification of the second interaction.

According to an example embodiment, wherein the instructions are configured to cause the processor to: control to form a first shared object representing a selected content as an input of selecting a content contained in the first application is received and control to transmit information corresponding to the selected content to the second application based on a third interaction of moving the first shared object to the second app object received.

According to an example embodiment, wherein the instructions are configured to cause the processor to: control to form an editing space object for content editing in the augmented reality space and store a copy of the selected content in the editing space object as a fourth interaction of moving the first shared object to the editing space object is received.

According to an example embodiment, wherein the instructions are configured to cause the processor to: identify an input of forming an edited content at least by editing the copy in the editing space object, control to form a second shared object representing the edited content as an input of selecting the edited content is received and control to transmit the edited content to the second application as a fifth interaction of moving the second shared object to the second app object is received.

An operation method of an electronic device for providing an augmented reality mode according to an example embodiment includes identifying a first interaction in a state of outputting an execution screen of a first application with a first size, outputting an augmented reality space based on a real space recognized via a camera module as the first interaction is identified, the camera module comprising imaging circuitry, outputting, in the augmented reality space, a first app object of outputting the execution screen of the first application with a second size smaller than the first size and a second app object of outputting an execution screen of a second application different from the first application with the second size and outputting the execution screen of the second application corresponding to the selected second app object as a screen with the first size in response to identification of a second interaction of selecting the second app object.

According to an example embodiment, the operation method may further comprises, outputting the first app object and the second app object at a location in the augmented reality space corresponding to a location of the electronic device in the real space at a time point when the first interaction has occurred.

According to an example embodiment, wherein the first interaction includes an operation of moving the electronic device to a specific location in the real space.

According to an example embodiment, the operation method may further comprises, outputting the first app object and the second app object after terminating the output of the execution screen of the first application with the first size before or at the same time the augmented reality space is output and outputting the execution screen of the second application with the first size as the second interaction of moving the electronic device to a location of the second app object in the augmented reality space is received.

According to an example embodiment, the operation method may further comprises, forming a first shared object representing a selected content as an input of selecting a content contained in the first application is received and transmitting information corresponding to the selected content to the second application when a third interaction of moving the first shared object to the second app object is received.

According to an example embodiment, the operation method may further comprises, forming an editing space object for content editing in the augmented reality space and storing a copy of the selected content in the editing space object as a fourth interaction of moving the first shared object to the editing space object is received.

According to an example embodiment, the operation method may further comprises, identifying an input of forming an edited content by editing the copy in the editing space object, forming a second shared object representing the edited content as an input of selecting the edited content is received and transmitting the edited content to the second application as a fifth interaction of moving the second shared object to the second app object is received.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via at least a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a display;
a camera comprising imaging circuitry;
a processor operatively connected to the camera; and
memory operatively coupled to the processor,
wherein the memory stores instructions that, when executed, cause the electronic device to:
in response to execution of a first application stored in the electronic device, control to output, through the display, a first execution screen of the first application with a first size;
identify a first interaction in a state of outputting the first execution screen of the first application;
control to output, through the display, an augmented reality space based on a real space recognized via the camera as the first interaction is identified;
control to output a second app object with a second size smaller than the first size, at a location in the augmented reality space corresponding to a location in the real space where a previous interaction to fix the second app object occurred, wherein the second app object corresponds to a second application stored in the electronic device; and
in response to identification of a second interaction of selecting the second app object output with the second size by moving the electronic device to the location in the real space where the second app object is output, control to output, through the display, a second execution screen of the second application with the first size after terminating the output the augmented reality space.

2. The electronic device of claim 1, wherein the instructions cause the electronic device to control to output the second app object at the location in the augmented reality space corresponding to a location of the electronic device in the real space at a time point when the previous interaction has occurred.

3. The electronic device of claim 1, wherein the first interaction includes an operation of moving the electronic device to a specific location in the real space.

4. The electronic device of claim 1, wherein the instructions cause the electronic device to:
control to output, in the augmented reality space, a first app object of outputting the first execution screen, with the second size, wherein the first app object corresponds to the first application;
in response to identification of a third interaction of selecting a content contained in the first app object output with the second size, control to transmit information corresponding to the selected content to the second application.

5. The electronic device of claim 4, wherein the instructions cause the electronic device to:
control to form an editing space object for content editing in the augmented reality space; and
store a copy of the selected content in the editing space object as a fourth interaction of moving a first shared object to the editing space object is received.

6. The electronic device of claim 5, wherein the instructions cause the electronic device to:

identify an input of forming an edited content at least by editing the copy in the editing space object;
control to form a second shared object representing the edited content as an input of selecting the edited content is received; and
control to transmit the edited content to the second application as a fifth interaction of moving the second shared object to the second app object is received.

7. An operation method of an electronic device for providing an augmented reality mode, the method comprising:
in response to execution of a first application stored in the electronic device, outputting, through a display of the electronic device, a first execution screen of the first application with a first size;
identifying a first interaction in a state of outputting the first execution screen of the first application;
outputting, through the display, an augmented reality space based on a real space recognized via a camera as the first interaction is identified, the camera comprising imaging circuitry;
outputting a second app object with a second size smaller than the first size, at a location in the augmented reality space corresponding to a location in the real space where a previous interaction to fix the second app object occurred, wherein the second app object corresponds to a second application stored in the electronic device; and
in response to identification of a second interaction of selecting the second app object output with the second size by moving the electronic device to the location in the real space where the second app object is output, outputting, through the display, a second execution screen of the second application with the first size after terminating the output the augmented reality space.

8. The method of claim 7, further comprising:
outputting the second app object at the location in the augmented reality space corresponding to a location of the electronic device in the real space at a time point when the previous interaction has occurred.

9. The method of claim 7, wherein the first interaction includes an operation of moving the electronic device to a specific location in the real space.

10. The method of claim 9, further comprising:
outputting, in the augmented reality space, a first app object of outputting the first execution screen, with the second size, wherein the first app object corresponds to the first application; and
in response to identification of a third interaction of selecting a content contained in the first app object output with the second size, transmitting information corresponding to the selected content to the second application.

11. The method of claim 10, further comprising:
forming an editing space object for content editing in the augmented reality space; and
storing a copy of the selected content in the editing space object as a fourth interaction of moving a first shared object to the editing space object is received.

12. The method of claim 11, further comprising:
identifying an input of forming an edited content by editing the copy in the editing space object;
forming a second shared object representing the edited content as an input of selecting the edited content is received; and transmitting the edited content to the second application as a fifth interaction of moving the second shared object to the second app object is received.

\* \* \* \* \*